United States Patent

Noguchi et al.

[11] Patent Number: 5,929,204
[45] Date of Patent: Jul. 27, 1999

[54] PROCESS FOR REMOVING METALS FROM VINYLPHENOL-TYPE POLYMERS

[75] Inventors: Takeshi Noguchi, Funabashi; Tadashi Matsumoto, Omiya, both of Japan

[73] Assignee: Maruzen Petrochemical Co., Ltd., Tokyo, Japan

[21] Appl. No.: 09/016,248

[22] Filed: Jan. 30, 1998

[30] Foreign Application Priority Data

Feb. 21, 1997 [JP] Japan ................................. 9-054119

[51] Int. Cl.[6] ............................................... C08F 6/08
[52] U.S. Cl. ............................ 528/482; 528/492; 528/493; 528/495; 528/502 A; 528/503; 210/348; 210/500.27; 210/500.37; 210/500.38
[58] Field of Search ............................. 528/482, 492, 528/493, 495, 502 A, 503; 210/348, 500.27, 500.37, 500.38

[56] References Cited

U.S. PATENT DOCUMENTS

| | | |
|---|---|---|
| 2,802,820 | 8/1957 | Zech . |
| 4,007,113 | 2/1977 | Ostreicher . |
| 5,284,930 | 2/1994 | Matsumoto et al. . |
| 5,288,850 | 2/1994 | Matsumoto et al. . |

FOREIGN PATENT DOCUMENTS

| | | |
|---|---|---|
| 1-103604 | of 0000 | Japan . |
| 3-277608 | of 0000 | Japan . |
| 36-20045 | of 0000 | Japan . |
| 51-83691 | of 0000 | Japan . |
| 6-192318 | of 0000 | Japan . |
| 63-17486 | of 0000 | Japan . |
| 63-312307 | of 0000 | Japan . |
| 8-165313 | of 0000 | Japan . |

OTHER PUBLICATIONS

Fiber and Polymer Material Research Institute Report, vol. 128, p. 65 (1981).

*Primary Examiner*—Duc Truong
*Attorney, Agent, or Firm*—Melvin I. Stoltz

[57] ABSTRACT

Vinylphenol-type polymers are useful materials and are used in many fields such as photoresist, packaging material for IC, printed circuit board, lense, etc. When the polymers are used in an electronic field such as photoresist and packaging material for IC, it is desired to reduce metal concentration in the polymer in the order of ppb units. A simple and effective process for removing metals from vinylphenol-type polymers is disclosed. The process comprises passing an organic solvent solution of a vinylphenol-type polymer either through (a) a filter containing an ion exchange material and/or a chelate-forming material and generating a zeta ($\zeta$) potential by a cationic charge modifying agent or through (b) (i) a filter containing an ion exchange material and/or a chelate-forming material and (ii) a filter generating a zeta ($\zeta$) potential by a cationic charge modifying agent.

21 Claims, 1 Drawing Sheet

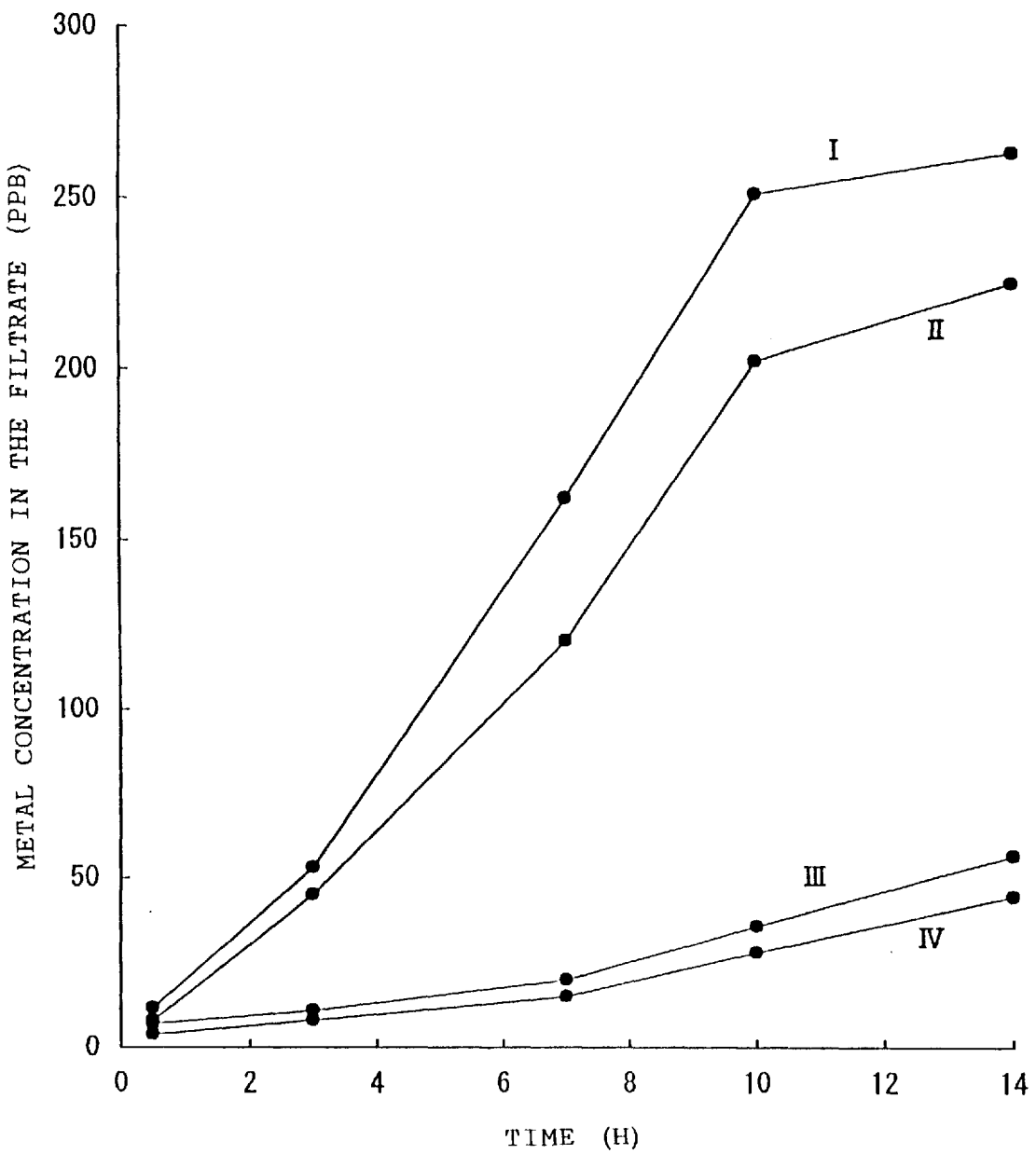

PROCESS FOR REMOVING METALS FROM VINYLPHENOL-TYPE POLYMERS

BACKGROUND OF THE INVENTION

1. Field of the Invention

The present invention relates to a process for removing metals such as sodium, iron, calcium, and the like contained in homopolymers of vinylphenols, copolymers of vinylphenols and other comonomers or modified products of these, or derivatives of these (hereinafter these polymers are collectively called "vinylphenol-type polymers"), by passing each of these polymers which are in a solution form, through a specific filter.

2. Description of the Prior Art

Vinylphenol-type polymers are used in the field of electronics such as photoresists, packaging materials for IC, printed-circuit boards, and the like. In order to use these vinylphenol-type polymers as materials for devices, and the like for which the precision have been more improved in recent years, it is required that the content of metal impurities in these materials be extremely low. It is thought that the metal content, particularly, of photoresists used for the precise processing of LSI of 256 megabits or more must be reduced to an extremely low trace content in the order of ppb units.

Various processes are known for manufacturing vinylphenol-type polymers. A process in which a monomer of vinylphenol produced by various processes, for example, dehydration of acetoxyphenylmethyl carbinol, decarboxylation decomposition of hydroxycinnamic acid, dehydrogenation of ethylphenol, or the like is homopolymerized or copolymerized with other comonomers in the presence of a cationic catalyst or a radical initiator is known as an industrial process.

The following process is also known. Specifically, a monomer in which a hydroxyl group of vinylphenol is protected by an acetyl group, trimethylsilyl group, t-butyl group, t-butoxycarbonyl group, or the like is synthesized. This monomer is polymerized in the presence of a cationic or anionic catalyst, or radical initiator to prepare a polymer, followed by removing the capped group. In this process, a monodisperse polymer can be produced by a so-called living polymerization depending on the selection of the protective group and the initiator (Japanese Patent Application Laid-open No. Hei 3(1991)-277608).

Further, there are known processes including a process in which each of these vinylphenol-type polymers is converted into a modified product having excellent light transmittance by hydrogenation (Japanese Patent Application Laid-open No. Hei 1(1989)-103604), a process of manufacturing various ether or ester derivatives by the reaction of hydroxyl groups of these vinylphenol-type polymers (Japanese Patent Application Laid-open No. Sho 63(1988)-312307 and Fiber and Polymer Material Research Institute Report, Vol. 128, page 65 (1981)), and a process of manufacturing various kinds of nuclear substituted products of vinylphenol-type polymers (Japanese Patent Application Laid-open No. Sho 51(1976)-83691).

However, in the vinylphenol-type polymers produced by or modified by these processes, contamination by metals occurs, for example, by sodium, iron, calcium, and the like which are contained in the starting raw materials or auxiliary materials or derived from materials of manufacturing facilities used in manufacturing processes and from contamination of facilities and environments.

For this reason the following processes have been proposed in the past:

(a) A process in which a vinylphenol-type polymer dissolved in a solvent is allowed to contact with a strongly acidic cation exchange resin (U.S. Pat. No. 5,288,850);

(b) a process in which a vinylphenol-type polymer dissolved in a solvent is treated by a specific hydrogenating process, then the solution treated in the hydrogenating process is subjected-to a metal removing process in which the solution is allowed to contact with a strongly acidic cation exchange resin (U.S. Pat. No. 5,284,930);

(c) a process in which a vinylphenol-type polymer dissolved in an organic solvent is allowed to contact with a solution containing an acidic compound and then contact with an ion exchanged water (Japanese Patent Application Laid-open No. Hei 6(1994)-192318); and (d) a process in which a vinylphenol-type polymer dissolved in a solvent is allowed to pass through a filter generating a zeta ($\zeta$) potential, i.e. interfacial electrokinetic potential, by a cationic charge modifying agent (Japanese Patent Application Laid-open No. Hei 8(1996)-165313).

There are, however, the following problems in these processes (a) and (b) contacting with a strongly acidic cation exchange resin. Specifically, the use of a packed column with a length of several tens of centimeters is usually required in the case of using these processes in a practical, industrial scale, and the flow rate of the solution of vinylphenol-type polymer cannot be maintained so high, in order to keep a high degree of metal removal, resulting in poor productivity. In fact, the references state that liquid hourly space velocity (LHSV) of the solution to be treated is 0.2–5 $h^{-1}$, and LHSV of 0.2 $h^{-1}$ is used in Example 1 of both references. Also, because the residence time in the column is long, and the like, if an inappropriate solvent is used, the solvent is partly decomposed to produce an acid, and the acid is mixed in the solution so that there is the case where a vinylphenol-type polymer thus obtained is not suitable for photoresist materials.

The process (c) contacting with an aqueous solution containing an acidic compound has the following drawbacks. Specifically, if a water-soluble solvent with a low boiling point such as methanol, acetone, or the like is used, vinylphenol-type polymer is precipitated in the case of the process (c), notwithstanding the solvent usually well dissolves vinylphenol-type polymer. Also, when a solvent which has a high boiling point and has a tendency to easily separate from an aqueous solution in general is used, there is the case where the vinylphenol-type polymer solution and the aqueous solution form an emulsion to cause difficulty in separation whereby the kind of usable solvent is limited. Also, distillation under a reduced pressure is required to remove water from the solution after washing, and thus complicating the process.

The process (d) removing metals by a filter generating a zeta ($\zeta$) potential is an attractive process because a considerably high degree of metal removal can be attained by only simple operation such as filtration and the solution can be treated at a high flow rate, leading to high productivity. However, the total amount of metals which can be trapped is comparatively small and the life of the capability of the filter of removing metals is short. It is necessary that the filter be replaced in a short period of time and hence process (d) is economically unsatisfactory.

SUMMARY OF THE INVENTION

The present invention has been achieved to solve these problems. It is an object of the present invention to solve the problems in the conventional processes for metal removal from a vinylphenol-type polymer and to provide a process for removing metals contained in a vinylphenol-type polymer efficiently and economically to reduce the metal content to an extremely low level using a simple apparatus and operation.

We have conducted extensive studies to achieve the above object and, as a result, found that the object can be easily attained by dissolving a vinylphenol-type polymer in a solvent to produce a solution, and by passing the solution through a filter of a specific type, and have completed the present invention.

Thus, the gist of the present invention resides in a process for removing metals from a vinylphenol-type polymer comprising passing an organic solvent solution of a vinylphenol-type polymer either through (a) a filter containing an ion exchange material and/or a chelate-forming material and generating a zeta ($\zeta$) potential by a cationic charge modifying agent or through (b) (i) a filter containing an ion exchange material and/or a chelate-forming material and (ii) a filter generating a zeta ($\zeta$) potential by a cationic charge modifying agent.

DRAWING

FIG. 1 is a graph showing the relationship between time after the start of the filtration and concentration of sodium and iron in the filtrate obtained in Example 1 and Comparative Example 1, wherein the horizontal axis shows time (h) from the start of the filtration, and the vertical axis shows metal concentration in the filtrate (ppb).

DETAILED DESCRIPTION OF THE INVENTION

The present invention will now be explained in more detail.

As examples of the vinylphenol-type polymer to which the process of the present invention is applied, the following compounds are given:

(a) Homopolymers of vinylphenols such as p-vinylphenol, m-vinylphenol, or o-vinylphenol, or copolymers of these;

(b) copolymers of the above vinylphenols (a) and other comonomers such as styrene, acrylic acid or its esters, methacrylic acid or its esters, maleic anhydride, maleic acid or its esters, maleimides, or the like;

(c) esters produced by reacting a phenolic hydroxyl group of the above polymers (a) or (b) with acetic acid, benzoic acid, or the like, or ethers produced by reacting a phenolic hydroxyl group of the above polymers (a) or (b) with a methyl group, t-butyl group, t-butoxycarbonyl group, trimethylsilyl group, allyl group, or the like;

(d) nuclear substituted products of the above polymers (a) or (b), such as nuclear alkylated products, nuclear halogenated products, nuclear hydroxymethylated products, or the like;

(e) hydrogen-treated modified products produced by hydrogenating the above polymers (a) or (b); and (f) modified products produced by heat-fusion of the above polymers (a) or (b), or by heat-fusion of the above polymers (a) or (b) together with a novolak-type phenol resin.

In the present invention, a solution produced by dissolving each of the above various vinylphenol-type polymers or modified products of these vinylphenol-type polymers in a solvent is passed either through (a) a filter containing an ion exchange material and/or a chelate-forming material and generating a zeta ($\zeta$) potential by a cationic charge modifying agent or through (b) (i) a filter containing an ion exchange material and/or chelate-forming material and (ii) a filter generating a zeta ($\zeta$) potential by a cationic charge modifying agent. Hereinafter, filter of (a), filter of (b) (i) containing an ion exchange material and/or chelate-forming material and filter of (b) (ii) are collectively called "functional filter". As the solvent for dissolving the vinylphenol-type polymer, any solvent capable of dissolving the vinylphenol-type polymer may be used. Examples of the solvent include, depending on the types of vinylphenol-type polymer and process conditions, alcohols such as methanol, ethanol, isopropanol, and the like; esters such as ethyl acetate, ethyl lactate, and the like; cyclic ethers such as tetrahydrofuran, dioxane, and the like; ketones such as acetone, methyl ethyl ketone, and the like; and alkylene glycol ethers or esters such as ethylene glycol monoethyl ether, ethylene glycol monoethyl ether acetate, ethylene glycol dimetyl ether, diethylene glycol dimethyl ether, propylene glycol monomethyl ether acetate, propylene glycol monoethyl ether acetate, and the like. Among these solvents, methanol, ethanol, isopropanol, tetrahydrofuran, dioxane, acetone, ethyl lactate, propylene glycol monomethyl ether acetate, diethylene glycol dimethyl ether, or a mixture of these is preferably used. In the case of using the above hydrogen-treated modified products (e), the product solution after the hydrotreatment may be preferably used only by removing a catalyst.

The substrate materials, i.e. filter media, of the functional filter used in the present invention are generally composed of a fiber component, a particulate component, and the like. As the fiber component, cotton, pulp, cellulose acetate, polyester fiber, or the like is usually used. As the particulate component, diatomaceous earth, pearlite, activated carbon, zeolite, or the like is usually used.

As for the functional filter used in the present invention, the phrase "generating a zeta ($\zeta$) potential by a cationic charge modifying agent" means that cationic charge is supplied to the filter by the cationic charge modifying agent contained in the filter materials thereby generating a zeta ($\zeta$) potential between electrically charged substances which are impurities in a solution and the filter materials in the course of filtering.

Examples of materials generally used as the cationic charge modifying agent include a polyamide polyamine epichlorohydrin cationic resin described in Japanese Patent Publication No. Sho 63(1988)-17486; a resin produced by reacting N,N'-diethanol piperazine, melamine, formalin, and glycerol phthalate, which is described in Japanese Patent Publication No. Sho 36(1961)-20045; a melamine-formaldehyde cationic resin described in U.S. Pat. No. 4,007,113; a reaction product of dicyandiamide, monoethanol amine, and formaldehyde described in U.S. Pat. No. 2,802,820; an aminotriazine resin described in U.S. Pat. No. 2,839,506; and the like. Among these, polyamide polyamine epichlorohydrin cationic resin is preferably used because it can supply a cationic charge stably.

The filter generating a zeta ($\zeta$) potential in the present invention is comparatively thin, in the order of 10 mm or less in general, hence there is almost no problem of flow resistance.

The above-described Japanese Patent Publication No. Sho 63(1988)-17486 discloses a method of manufacturing a filter in which a polyamide polyamine epichlorohydrin resin is used as the cationic charge modifying agent, cellulose fiber is used as the fiber component, and diatomaceous earth or pearlite is used as the particulate component.

The ion exchange material and/or chelate-forming material which is used as an example of the functional filter in the present invention or which is one of the constituents of the functional filter is a material produced by introducing a functional group having an ion exchange function or a chelate-forming function into a polymer such as a styrenic polymer, acrylic polymer, vinyl alcoholic polymer, polyester, cellulose, or the like. There are no limitations to the shape of the ion exchange material or chelate-forming materials. Any shape including a particulate-type, fiber-type or porous film-type, and porous membrane-type can be used. Incidentally, these porous film-type and porous membrane-type are hereinafter abbreviated simply as "film-type" and "membrane-type", respectively. The particulate-type is usually called "ion exchange resin" or "chelate resin" and the fiber-type is usually called "ion exchange fiber" or "chelate fiber".

Specifically, as the ion exchange material, a particulate-type, fiber-type or film-type, or membrane-type composed of a strongly acidic cation exchange material, weakly acidic cation exchange material, strongly basic anion exchange material, or weakly basic anion exchange material is used. Here, as examples of the strongly acidic cation exchange material, compounds produced by sulfonating a styrene polymer cross-linked with divinylbenzene are given. As examples of the weakly acidic cation exchange material, copolymers of acrylic acid or methacrylic acid cross-linked with divinylbenzene are given. Also, as examples of the strongly basic anion exchange material, compounds produced by aminomethylation of a styrene polymer cross-liked with divinylbenzene and then conducting quaternarization of the aminomethylated compound are given. As examples of the weakly basic anion exchange material, compounds produced by forming an aminomethyl compound of a styrene polymer cross-linked with divinylbenzene or acrylamide polymers having an aminomethyl group cross-linked with divinylbenzene are given.

Examples of the chelate-forming material include particulate-types, fiber-types, film-types, or membrane-types of resins produced by introducing an iminodiacetic acid structure-containing group into a styrene polymer cross-linked with divinylbenzene or of resins produced by introducing an polyethyleneimine structure-containing group into a styrene polymer cross-linked with divinylbenzene. Not only one but also two or more of these various ion exchange materials or chelate-forming materials may be included in one filter.

The ion exchange material or the chelate-forming material includes a gel type, having no pores, and a porous type. Both of these types are effective in the present invention though the porous type which has a large surface area and many active sites is preferable. Also, a particulate-type of micropowder which is as finer as possible is desirable because of its large surface area. Specifically, the particle diameter of the particulate-type is 200 $\mu$m or less and preferably from 0.1 to 50 $\mu$m.

When the ion exchange material or the chelate-forming material is a fiber-type, the diameter of fiber is from 0.05 to 100 $\mu$m and preferably from 0.1 to 50 $\mu$m, and its length is from 0.1 to 10 mm and preferably from 0.5 to 10 mm.

The functional filter used in the present invention can be made into filters having various functions depending on the ways of addition and formulation of the above cationic charge modifying agent and ion exchange material or chelate-forming material. In this case, the most general filters obtained in the step of manufacturing a filter are those prepared by adding (1) a cationic charge modifying agent to the other constituents of filter media, those prepared by adding (2) an ion exchange material and/or chelate-forming material to the other constituents of filter media, and those prepared by adding (3) the above constituents (1) and (2) to the other constituents of filter madia. The content of the cationic charge modifying agent in the filter is in a range of from 0.5 to 10% by weight and preferably from 1 to 5% by weight. Also, the content of the ion exchange material and/or chelate-forming material in the filter is in a range of from 1 to 50% by weight and preferably from 5 to 30% by weight. If the content is less than the above defined range, the effect of the present invention is impaired, whereas if the content is larger than the above defined range, not only the mechanical strength of the filter is insufficient, but also it is uneconomical though it depends on the type and shape of the filter. In the case of using the ion exchange material or chelate-forming material of the fiber-type, these act as the fiber component which is the material for strengthen the functional filter used in the present invention which differs from the case of using the particulate-type material. Therefore, there is an advantage that even if the ion exchange material or chelate-forming material of the fiber-type is used in a comparatively large amount, the mechanical strength of the filter is not impaired.

The ratio by weight of the cationic charge modifying agent to the ion exchange material and/or chelate-forming material is generally 1:0.1–100 and preferably 1:1–30.

In the present invention, when using the filter containing the ion exchange material and/or chelate-forming material together with the filter generating a zeta ($\zeta$) potential, the shape of the filter containing ion exchange material and/or chelate-forming material is not limited to that of the conventional filter. Since the effect of filtration intended in the process of the present invention is obtained by the filter generating a zeta ($\zeta$) potential by a cationic charge modifying agent, the use of the ion exchange material and/or chelate-forming material in the form of a filter is as a matter of convenience for handling. However, easy handling can be attained and sufficient effect can be obtained by using a filter-type, hence it is desirable to use filter-type in practice.

The object of the present invention is to reduce the metal content in the vinylphenol-type polymer. When a solution of the vinylphenol-type polymer is filtered by these functional filters, the particle diameter of the target substances to be removed from the solution, that is, the precision of filtration, raises almost no problem. The precision of filtration differs depending on the kinds, compositions, and preparative methods of filter media. The precision of filtration of the functional filter generating a zeta ($\zeta$) potential by a cationic charge modifying agent is generally from 0.05 to 5.0 $\mu$m, which is a sufficient level, and preferably from 0.1 to 1.0 $\mu$m. In the filter generating a zeta ($\zeta$) potential, electrically charged particles existing in the solution are adsorbed due to the generated potential difference whereby even impurities of a size smaller than the pores of the filter can be trapped by the filter. Because a part of the trace amount of metals contained in the solution of vinylphenol-type polymer exists in the form of microparticles, such as microgel, the part can be trapped by the filter generating a zeta ($\zeta$) potential, and the ion exchange material and the chelate-forming material primarily trap free ions in the solution, therefore various metals with different existential forms can be widely removed by the process of the present invention.

Commercially available products can be widely used as the various functional filters used in the process of the present invention. For example, as the filter containing the ion exchange resin or the chelate resin and generating a zeta (ζ) potential, a Zeta Plus SH series (trade name, manufactured by Cuno Inc.) is preferably used. As the filter generating a zeta (ζ) potential but containing no ion exchange resin nor the chelate resin, a Zeta Plus LA series (trade name, manufactured by Cuno Inc.) can be preferably used.

Embodiments in which the solution of the vinylphenol-type polymer is filtered by the above functional filter include (1) a process of passing the polymer solution through the filter containing the ion exchange material and/or chelate-forming material and generating a zeta (ζ) potential by the cationic charge modifying agent; and (2) a process of passing the polymer solution sequentially through two filters, specifically, the filter containing the ion exchange material and/or chelate-forming material and the filter generating a zeta (ζ) potential by the cationic charge modifying agent. In the latter process, it was confirmed to be more effective for removing metals from the solution that the solution is passed first through the filter containing the ion exchange material and/or chelate-forming material and then through the filter generating zeta (ζ) potential by the cationic charge modifying agent. When comparing the processes (1) and (2), the process (1) is more advantageous in view of maintenance and control of the facilities.

In order to prevent the contamination with substances eluted from the filter, it is desirable that the filter be washed in advance with a solvent such as pure water, methanol, acetone, or the like before the solution of the vinylphenol-type polymer is passed through the functional filter.

If the concentration of the vinylphenol-type polymer in the polymer solution when the polymer solution is passed through the functional filter is too high, the viscosity of the solution increases, hence high pressure is required to pass the solution through the filter, which is undesirable. On the other hand, an exceedingly low concentration of the vinylphenol-type polymer is undesirable because the throughput per unit time of the vinylphenol-type polymer decreases, although this has an advantage in that the filtering operation can be performed under a low pressure. Also, the use of exceedingly low concentration is undesirable because excess work and costs are required for succeeding processes for concentration and solvent removal which are required, as the case may be. Accordingly, the concentation of the polymer in the solution is appropriately in a range of from 10 to 40% by weight.

It is desirable that the flow rate of the processing solution be higher in view of productivity. However, if the flow rate is too high, high pressure is required to pass the solution through the filter and the rate of removing metals decreases. For these reasons, in general, it is appropriate to use a flow rate in a range of from 0.05 to 5 kg/m$^2$·min. The flow rate mentioned above is significantly larger than the flow rate used in U.S. Pat. No. 5,288,850 and U.S. Pat. No. 5,284,930 aforementioned.

If the temperature at which the solution of the vinylphenol-type polymer is passed through the functional filter is high, there is the advantage that the viscosity of the solution decreases, the processing speed can be increased, and the adsorption rate increases. However, an exceedingly high temperature is undesirable because it causes deterioration of the filter, decomposition of the solvent, and the denaturation of the vinylphenol-type polymer. On the other hand, if the temperature is too low, the viscosity of the polymer solution increases, which is a cause of difficult filtration. Accordingly, the temperature is generally from 5 to 80° C. and preferably from room temperature to 50° C.

When the solution of the vinylphenol-type polymer is passed through the functional filter according to the process of the present invention, it is desirable to perform a pretreatment using a usual filter containing none of ion exchange material, chelate-forming material, and cationic charge modifying agent. Specifically, since particles of impurities, particularly, large particles can be caught by the usual filter, the clogging of the functional filter can be avoided, a rise with time of the pressure required when passing the vinylphenol-type polymer solution through the functional filter decreases, and, at the same time, the deterioration in a metal-trapping capability of the functional filter is repressed whereby the life of the filter can be prolonged. As the usual filter used for the pretreatment, any filter of a surface-filtration-type, making use mainly of a surface filtration action of filter media, and a filter of a filter-material-filtration-type making use mainly of capillaries exsisting inside of filter media can be used. Appropriate materials used for the usual filter are those which are formed of cellulose, cotton, polypropylene, polytetrafluoroethylene, or the like and have no tendency to release metals. The appropriate precision of the conventional filtration is generally in the range of from 0.1 to 10 μm and preferably in the range of from 0.5 to 5 μm, though there are no limitations to the precision of filtration.

The vinylphenol-type polymer, of which the metal content is reduced by the process of the present invention illustrated as above, may be applied to various fields as it is in solution after its concentration is adjusted as required or may be converted into refined products pouring the solution into pure water to precipitate the polymer, followed by filtration and drying, or by the method of heat-treating the solution under a reduced pressure to remove the solvent, followed by drying.

According to the process of the present invention, various kinds of metals in a wide range of alkali metals, alkaline earth metals, earth metals and transition metals such as sodium, magnecium, calcium, aluminum, and iron can be removed in a high rate from a solution of many types of vinylphenol-type polymers or copolymers, modified products of these, or derivatives of these by a very simple operation, i.e. filtration. Differring to a conventional process using a filter merely containing a substance generating a zeta (ζ) potential, in the process of the present invention, filters can have a long life for the retention of metal removing ability, and therefore, by the process of the present invention, more economical and more efficient removal of metal can be achieved. Vinylphenol-type polymers or copolymers, modified products of these, or derivatives of these from which metal impurities have been removed by the process of the present invention can suitably be used in the field of electronics such as photoresist.

DESCRIPTION OF THE PREFERRED EMBODIMENTS

The present invention will be explained in more detail by way of examples and comparative examples, which are not intended to be limiting the present invention. Incidentally, in the examples and comparative examples below, "part (s)" and "percent (%)" indicate "part(s) by weight" and "percent (%) by weight" unless otherwise specified.

EXAMPLE 1

Poly-p-vinylphenol (weight average molecular weight: 5,000) was dissolved in ethyl lactate to prepare a 25% solution. A filter generating a zeta (ζ) potential by a cationic charge modifying agent, and containing a strongly acidic cation exchange resin powder (a disk-type filter with a diameter of 90 mm and a thickness of 3 mm, consisting of pulp 30%, a mixture of diatomaceous earth and pearlite 48%, polyamide polyamine epichlorohydrin resin 2%, and sulfonated polystyrene cross-linked with divinylbenzene 20%) was washed with 200 ml of pure water and 200 ml of methanol and then with 100 ml of ethyl lactate. The solution containing poly-p-vinylphenol was passed through the filter at a flow rate of 0.45 kg/m$^2$·min at a temperature of 25° C. If the flow rate is expressed in the term of LHSV, the flow rate corresponds to approximately 9.4 h$^{-1}$. Metals in the solution before and after filtration were measured using a flameless atomic absorption spectrometer. As a result, the solution before filtration contained 220 ppb of sodium, 260 ppb of iron, 110 ppb of potassium, and 60 ppb of calcium, and the solution after filtration taken at 7 hours from the start of the filtration contained 15 ppb of sodium, 20 ppb of iron, 18 ppb of potassium, and 20 ppb of calcium.

Comparative Example 1

A filter generating a zeta (ζ) potential by cationic charge modifying agent, but containing no strongly acidic cation exchange resin (a disk-type filter with a diameter of 90 mm and a thickness of 3 mm, consisting of pulp 30%, a mixture of diatomaceous earth and pearlite 68%, and polyamide polyamine epichlorohydrin resin 2%) was washed with 200 ml of pure water and 200 ml of methanol and then with 100 ml of ethyl lactate. The ethyl lactate solution containing poly-p-vinylphenol, which was the same solution as used in Example 1, was passed through the filter in the same manner and under the same condition as in Example 1. The solution after filtration taken at 7 hours from the start of the filtration contained 120 ppb of sodium, 160 ppb of iron, 80 ppb of potassium, and 55 ppb of calcium, showing a large increase in the content of each of these metals when compared to the results obtained in Example 1.

FIG. 1 is a graph showing the relationship between time after the start of the filtration and concentration of sodium and iron in the filtrate obtained in Example 1 and Comparative Example 1, wherein the horizontal axis shows time (h) from the start of the filtration, and the vertical axis shows metal concentration in the filtrate (ppb), and line I shows the concentration of iron in Comparative Example 1, line II shows the concentration of sodium in Comparative Example 1, line III shows the concentration of iron in Example 1, and line IV shows the concentration of sodium in Example 1.

As is clear from FIG. 1, the rate of increase in the amount of metals with time in Example 1 is remarkably smaller than that in Comparative Example 1, showing that Example 1 is superior to Comparative Example 1.

EXAMPLE 2

A 25% solution of poly-p-vinylphenol was obtained by dissolving a poly-p-vinylphenol (weight average molecular weight: 5,000) in a mixed solvent of isopropanol and methanol (isopropanol/methanol weight ratio: 9/1). The solution was hydrotreated in an autoclave by using a nickel catalyst at a temperature of 210° C. under a pressure of 7.0 MPa (ca.70 Kg/cm$^2$) for 2 hours. The nickel catalyst was removed from the treated solution by filtration through a filter paper with 1 μm pores. The filtrate was passed directly through a functional filter same as that used in Example 1 at a flow rate of 0.40 kg/m$^2$·min at a temperature of 25° C. The flow rate corresponds to an LHSV of approximately 9.0 h$^{-1}$. The solution before filtration contained 400 ppb of sodium, 180 ppb of iron, 120 ppb of calcium, 20 ppb of aluminum, and 8 ppb of magnecium. The solution after filtration with the functional filter taken after 5 hours from the start of the filtration contained 18 ppb of sodium, 20 ppb of iron, 24 ppb of calcium, less than 6 ppb of aluminum, and 3 ppb of magnecium.

Comparative Example 2

A functional filter same as that used in Comparative Example 1, i.e. a filter generating a zeta (ζ) potential but containing no strongly acidic cation exchange resin, was washed with pure water, methanol and ethyl lactate, successively. Then, the hydrotreated solution of poly-p-vinylphenol used in Example 2 was passed through the functional filter in the same conditions as in Example 2. The filtrate taken after 1 hour from the start of the filtration contained 14 ppb of sodium, 12 ppb of iron, 4 ppb of calcium, 5 ppb of aluminum, and 3 ppb of magnecium. The filtrate taken after 5 hours from the start of the filtration contained 270 ppb of sodium, 84 ppb of iron, 100 ppb of calcium, 17 ppb of aluminum, and 6 ppb of magnecium.

That is, after 5 hours from the start of the filtration, the metal removing ability of the functional filter was decreased, and therefore, the metal concentrations of the filtrate were not sufficiently lowered.

EXAMPLE 3

A copolymer of p-vinylphenol and methyl methacrylate (p-vinylphenol/methyl methacrylate mole ratio: 55/45; weight average molecular weight: 8,200) was dissolved in propylene glycol monoethyl ether acetate thereby obtained a 25% solution. Meanwhile, a functional filter generating a zeta (ζ) potential and containing a weakly acidic cation exchange resin (composition: pulp 30%, a mixture of diatomaceous earth and pearlite 38%, a copolymer of styrene and acrylic acid cross-linked with divinylbenzene 30% and polyamide polyamine epichlorohydrin resin 2%; a disk-type filter with a diameter of 90 mm and a thickness of 3 mm) was washed with 200 ml of pure water, 200 ml of methanol and 100 ml of propylene glycol monoethyl ether acetate, successively. Then, the p-vinylphenol-methyl methacrylate copolymer solution prepared above was passed through the functional filter in a flow rate of 0.45 kg/m$^2$·min at a temperature of 25° C. The solution before filtration contained 1160 ppb of sodium, 880 ppb of iron, and 180 ppb of calcium. The filtrate taken after 5 hours from the start of the filtration contained 25 ppb of sodium, 100 ppb of iron, and 14 ppb of calcium.

Comparative Example 3

A functional filter same as that used in Comparative Example 1, i.e. a filter generating a zeta (ζ) potential but containing no ion exchange resin, was washed with pure water, methanol and propylene glycol monoethyl ether acetate, successively. Then, the propylene glycol monoethyl ether acetate solution of p-vinylphenol-methyl methacrylate copolymer prepared in Example 3 was passed through the functional filter in the same conditions as used in Example 3. The filtrate taken after 1 hour from the start of the filtration contained 30 ppb of sodium, 550 ppb of iron, and 20 ppb of calcium. The filtrate taken after 5 hours from the start of the filtration contained 540 ppb of sodium, 750 ppb of iron, and 150 ppb of calcium.

EXAMPLE 4

Poly-m-vinylphenol (weight average molecular weight: 8,000) was dissolved in isopropanol to form a 25% solution.

A functional filter generating a zeta (ζ) potential and containing a chelate resin (composition: pulp 30%, a mixture of diatomaceous earth and pearlite 28%, a styrene polymer cross-linked with divinylbenzene and substituted with groups having the structure of iminodiacetic acid 40%, and a polyamide polyamine epichlorohydrin resin 2%; a disk-type filter with a diameter of 90 mm and a thickness of 3 mm) was washed with 200 ml of pure water, 200 ml of methanol and 100 ml of isopropanol, successively. Then, the solution of poly-m-vinylphenol prepared above was passed through the functional filter in a flow rate of 0.50 kg/m$^2$·min at a temperature of 25° C. The flow rate corresponds to an LHSV of approximately 11.2 h$^{-1}$. The solution before filtration contained 240 ppb of sodium, 250 ppb of iron, and 110 ppb of calcium. The filtrate taken after 4 hours from the start of the filtration contained 10 ppb of sodium, 12 ppb of iron, and 15 ppb of calcium.

EXAMPLE 5

A brominated poly-p-vinylphenol (extent of bromination: 1.5 Br atom/benzene nucleus; weight average molecular weight: 6,700) was dissolved in diethylene glycol dimethyl ether to form a 25% solution. The solution prepared above was passed through the functional filter same as that used in Example 1 in a flow rate of 0.50 kg/m$^2$·min at a temperature of 25° C. The solution before filtration contained 98 ppb of sodium, 170 ppb of iron, and 75 ppb of calcium. The filtrate taken after 5 hours from the start of the filtration contained 20 ppb of sodium, 25 ppb of iron, and 14 ppb of calcium.

EXAMPLE 6

A copolymer of p-vinylphenol and tert-butyl acrylate (composition: p-vinylphenol/tert-butyl acrylate=60/40 mole ratio; weight average molecular weight: 8,500) was dissolved in methanol to form a 25% solution. The solution prepared above was passed through a functional filter containing a strongly acidic cation exchange resin but not generating a zeta (ζ) potential (composition: pulp 30%, a mixture of diatomaceous earth and pearlite 50%, and a sulfonated polystyrene cross-liked with divinylbenzene 20%; a disk-type filter with a diameter of 90 mm and a thickness of 3 mm) and then was passed through a functional filter generating a zeta (ζ) potential but not containing a cation exchange resin same as that used in Comparative Example 1 in a flow rate of 0.50 kg/m$^2$·min at a temperature of 25° C., respectively.

The solution before filtrations contained 250 ppb of sodium, 200 ppb of iron, and 160 ppb of calcium. The filtrate obtained by the filtrations taken after 5 hours from the start of the filtrations contained 21 ppb of sodium, 25 ppb of iron, and 30 ppb of calcium.

EXAMPLE 7

The solution used in Example 6 was passed through a functional filter generating a zeta (ζ) potential but containing no cation exchange resin same as that used in Comparative Example 1 and then was passed through a functional filter containing a strongly acidic cation exchange resin but not generating a zeta (ζ) potential same as that used in Example 6 in a flow rate of 0.50 kg/m$^2$·min at a temperature of 25° C., respectively. The filtrate obtained by the filtrations taken after 5 hours from the start of the filtrations contained 25 ppb of sodium, 30 ppb of iron, and 36 ppb of calcium.

EXAMPLE 8

A poly-p-vinylphenol (weight average molecular weight: 5,200) was dissolved in methanol to form a 25% solution.

Meanwhile, a functional filter generating a zeta (ζ) potential by a cationic charge modifying agent and containing a fibrous strongly acidic cation exchange resin (composition: pulp 20%, a mixture of diatomaceous earth and pearlite 38%, polyamide polyamine epichlorohydrin resin 2%, and a sulfonated polystyrene cross-linked with divinylbenzene in a form of fiber with diameter of 40 μm 40%; a disk-type filter with diameter of 90 mm and thickness of 3 mm) was washed with 200 ml of pure water and 200 ml of methanol, successively. The poly-p-vinylphenol solution prepared above was passed through the functional filter in a flow rate of 0.90 kg/m$^2$·min at a temperature of 25° C. The flow rate corresponds to an LHSV of approximately 20.2 h$^{-1}$. The solution before filtration contained 250 ppb of sodium, 190 ppb of iron, and 70 ppb of calcium. The filtrate taken after 4 hours from the start of the filtration contained 10 ppb of sodium, 15 ppb of iron, and 17 ppb of calcium.

What is claimed is:

1. A process for removing metals from vinylphenol-type polymer comprising passing an organic solvent solution of a vinylphenol-type polymer either through (a) a filter containing an ion exchange material and/or a chelate-forming material and generating a zeta (ζ) potential by a cationic charge modifying agent or through (b) (i) a filter containing an ion exchange material and/or a chelate-forming material and (ii) a filter generating a zeta (ζ) potential by a cationic charge modifying agent.

2. The process according to claim 1, wherein the flow rate of the organic solvent solution passing through the filter defined in (a) or the filter defined in (ii) is in a range of from 0.05 to 5 kg/m$^2$·min.

3. The process according to claim 1, wherein the concentration of vinylphenol-type polymer in the organic solvent solution is from 10 to 40% by weight.

4. The process according to claim 1, wherein the organic solvent solution is passed through the filter defined in (a) or the filter defined in (ii) at a temperature of from 5 to 80° C.

5. The process according to claim 1, wherein the cationic charge modifying agent is selected from the group consisting of polyamide polyamine epichlorohydrin cationic resin; a resin produced by reacting N,N'-diethanol piperazine, melamine, formalin, and glycerol phthalate; melamine-formaldehyde cationic resin; a reaction product of dicyandiamide, monoethanol amine, and formaldehyde; and an aminotriazine resin.

6. The process according to claim 2, wherein the concentration of vinylphenol-type polymer in the organic solvent solution is from 10 to 40% by weight, the organic solvent solution is passed through the filter at a temperature of from 5 to 80° C., and the cationic charge modifying agent is polyamide polyamine epichlorohydrin cationic resin.

7. The process according to claim 1, wherein the organic solvent solution is passed through the filter defined in (a).

8. The process according to claim 7, wherein the flow rate of the organic solvent solution passing through the filter is in a range of from 0.05 to 5 kg/m$^2$·min.

9. The process according to claim 7, wherein the concentration of vinylphenol-type polymer in the organic solvent solution is from 10 to 40% by weight.

10. The process according to claim 7, wherein the organic solvent solution is passed through the filter at a temperature of from 5 to 80° C.

11. The process according to claim 7, wherein the cationic charge modifying agent is selected from the group consisting of polyamide polyamine epichlorohydrin cationic resin; a resin produced by reacting N,N'-diethanol piperazine, melamine, formalin, and glycerol phthalate; melamine-formaldehyde cationic resin; a reaction product of dicyandiamide, monoethanol amine, and formaldehyde; and an aminotriazine resin.

12. The process according to claim 8, wherein the concentration of vinylphenol-type polymer in the organic solvent solution is from 10 to 40% by weight, the organic solvent solution is passed through the filter at a temperature of from 5 to 80° C., and the cationic charge modifying agent is polyamide polyamine epichlorohydrin cationic resin.

13. The process according to claim 1, wherein the organic solvent solution is passed through the filter defined in (i) and the filter defined in (ii).

14. The process according to claim 13, wherein the organic solvent solution is first passed through the filter defined in (i) and then through the filter defined in (ii).

15. The process according to claim 13, wherein the flow rate of the organic solvent solution passing through the filter defined in (ii) is in a range of from 0.05 to 5 kg/m$^2$·min.

16. The process according to claim 13, wherein the concentration of vinylphenol-type polymer in the organic solvent solution is from 10 to 40% by weight.

17. The process according to claim 13, wherein the organic solvent solution is passed through the filter defined in (ii) at a temperature of from 5 to 80° C.

18. The process according to claim 13, wherein the cationic charge modifying agent is selected from the group consisting of polyamide polyamine epichlorohydrin cationic resin; a resin produced by reacting N,N'-diethanol piperazine, melamine, formalin, and glycerol phthalate; melamine-formaldehyde cationic resin; a reaction product of dicyandiamide, monoethanol amine, and formaldehyde; and an aminotriazine resin.

19. The process according to claim 14, wherein the flow rate of the organic solvent solution passing through the filter defined in (ii) is in a range of from 0.05 to 5 kg/m$^2$·min, the concentration of vinylphenol-type polymer in the organic solvent solution is from 10 to 40% by weight, the organic solvent solution is passed through the filter defined in (ii) at a temperature of from 5 to 80° C., and the cationic charge modifying agent is polyamide polyamine epichlorohydrin cationic resin.

20. An organic solvent solution of vinylphenol-type polymer purified by the process defined in claim 1.

21. A vinylphenol-type polymer obtained by removing the organic solvent from the organic solvent solution of vinylphenol-type polymer defined in claim 20.

* * * * *